United States Patent
Bengtsson et al.

(10) Patent No.: US 11,765,672 B2
(45) Date of Patent: Sep. 19, 2023

(54) METHOD AND DEVICE FOR SYNCHRONIZATION AND MEASUREMENT IN A RADIO COMMUNICATION SYSTEM

(71) Applicant: SONY CORPORATION, Tokyo (JP)

(72) Inventors: Erik Bengtsson, Eslöv (SE); Basuki Priyanto, Lund (SE); Samuel Atungsiri, Weybridge (GB)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 16/636,001

(22) PCT Filed: Sep. 28, 2018

(86) PCT No.: PCT/EP2018/076503
§ 371 (c)(1),
(2) Date: Feb. 1, 2020

(87) PCT Pub. No.: WO2019/068587
PCT Pub. Date: Apr. 11, 2019

(65) Prior Publication Data
US 2020/0337005 A1 Oct. 22, 2020

(30) Foreign Application Priority Data
Oct. 2, 2017 (SE) .................................... 1730274-6

(51) Int. Cl.
*H04W 56/00* (2009.01)
*H04W 76/27* (2018.01)
(Continued)

(52) U.S. Cl.
CPC ....... *H04W 56/0015* (2013.01); *H04L 1/1642* (2013.01); *H04W 8/24* (2013.01); *H04W 72/0453* (2013.01); *H04W 76/27* (2018.02)

(58) Field of Classification Search
CPC ... H04W 56/0015; H04W 76/27; H04W 8/24; H04W 72/0453; H04L 1/1642
See application file for complete search history.

(56) References Cited

U.S. PATENT DOCUMENTS

2013/0064239 A1 3/2013 Yu et al.
2014/0050206 A1 2/2014 Seo et al.
(Continued)

FOREIGN PATENT DOCUMENTS

CN 101754353 A 6/2010
CN 105075354 A 11/2015
(Continued)

OTHER PUBLICATIONS

U.S. Appl. No. 62/542,306,Specification (Year: 2017).*
(Continued)

*Primary Examiner* — Yu-Wen Chang
(74) *Attorney, Agent, or Firm* — TUCKER ELLIS LLP (57) ABSTRACT

A base station, a user equipment and methods are provided for establishing access in a base station for a user equipment and for performing measurement in a user equipment in a radio communication system. The method includes transmitting a plurality of synchronization signal blocks at different frequencies within a wideband carrier from the base station, wherein each synchronization signal block is associated with each one cell supported by the base station. An indication is received in the base station, that a user equipment supports wideband operation. A first cell signal is transmitted from the base station to the user equipment, which first cell signal provides information identifying the cells available within the wideband carrier.

20 Claims, 3 Drawing Sheets

(51) Int. Cl.
*H04L 1/1607* (2023.01)
*H04W 8/24* (2009.01)
*H04W 72/0453* (2023.01)

(56) References Cited

U.S. PATENT DOCUMENTS

| | | | | |
|---|---|---|---|---|
| 2015/0296467 | A1* | 10/2015 | Kim | H04W 76/27 |
| | | | | 370/330 |
| 2016/0088579 | A1* | 3/2016 | Harada | H04W 48/16 |
| | | | | 370/336 |
| 2018/0139036 | A1 | 5/2018 | Islam et al. | |
| 2019/0014493 | A1* | 1/2019 | Kim | H04W 76/27 |
| 2019/0053281 | A1* | 2/2019 | Åström | H04W 72/21 |
| 2019/0363809 | A1* | 11/2019 | Yoon | H04W 56/00 |
| 2020/0045671 | A1* | 2/2020 | Hapsari | H04W 68/02 |
| 2020/0068420 | A1* | 2/2020 | Chen | H04W 36/00 |
| 2020/0084651 | A1* | 3/2020 | Li | H04L 5/0053 |
| 2020/0092875 | A1* | 3/2020 | Takeda | H04W 72/048 |
| 2020/0100238 | A1* | 3/2020 | da Silva | H04W 72/0446 |
| 2020/0120530 | A1* | 4/2020 | Luo | H04W 24/10 |
| 2020/0120756 | A1* | 4/2020 | Wang | H04L 5/0055 |
| 2020/0163036 | A1* | 5/2020 | Fan | H04W 48/16 |
| 2020/0163037 | A1* | 5/2020 | Zheng | H04W 74/0808 |
| 2020/0178129 | A1* | 6/2020 | Siomina | H04W 36/0094 |
| 2020/0229017 | A1* | 7/2020 | Liu | H04W 56/001 |
| 2020/0322925 | A1* | 10/2020 | Takeda | H04L 27/2605 |
| 2020/0367243 | A1* | 11/2020 | Zhang | H04W 24/10 |
| 2021/0144596 | A1* | 5/2021 | Yang | H04W 52/02 |

FOREIGN PATENT DOCUMENTS

| | | |
|---|---|---|
| EP | 2472758 A1 | 7/2012 |
| WO | 2011090301 A2 | 7/2011 |

OTHER PUBLICATIONS

U.S. Appl. No. 62/521,265,Specification (Year: 2017).*
U.S. Appl. No. 62/521,089,Specification (Year: 2017).*
International Search Report and Written Opinion from corresponding International Patent Application No. PCT/EP2018/076503, dated Nov. 26, 2018, 9 pages.
Swedish Search Report from corresponding Swedish Patent Application No. 1730274-6, dated Jun. 11, 2018, 4 pages.
NTT Docomo, R1-1713896, "Discussion on Remaining Details on Multiple SS Block Transmissions in Wideband CC for NR", 3GPP, Aug. 20, 2017, 4 pages.
Intel Corporation, R1-1716276, "Remaining Details on SS Blocks," 3GPP, Sep. 17, 2017, 8 pages.
Qualcomm Inc., R2-1711364, "Considerations on CC and BWP in NR," 3GPP, Sep. 29, 2017, 5 pages.
OPPO, R1-1718058, "Remaining details on SS Block Transmissions," 3GPP, Sep. 30, 2017, 4 pages.
Office Action from corresponding Chinese Application No. 201880060815.5 dated Jun. 29, 2021.
European Office Action dated May 12, 2022 for U.S. Appl. No. 18/779,672 (8 pages).
NTT Docomo, Inc., Discussion on Remaining Details on Multiple SS Block Transmissions in Wideband CC for NR, 3GPP TSG RAN WG1 Meeting #90, Prague, Czech Republic, Aug. 21-25, 2017 (4 pages).
«3GPP TSG RAN WG1 Meeting #89 RI-1708494» May 15-19, 2017 NTT Docomo, Inc Further views on wider bandwidth operations for NR (6 pages).
«3GPP TSG RAN WG1 Meeting #90 RI-1713896» Aug. 25, 2017 NTT Docomo, Inc Discussion on remaining details on multiple SS block transmissions in wideband CC for NR (4 pages).
Chinese Notice of Allowance dated Jun. 28, 2022 for Application Serial No. 201880060815 (2 pages).

* cited by examiner

METHOD AND DEVICE FOR SYNCHRONIZATION AND MEASUREMENT IN A RADIO COMMUNICATION SYSTEM

TECHNICAL FIELD

This disclosure relates to solutions for synchronization and measurement upon establishing access in a base station for a user equipment in a radio communication system. More specifically, methods and devices are provided related to synchronization to a wideband base station, configured to transmit multiple synchronization signal blocks (SSB) in a wideband component carrier.

BACKGROUND

In state of the art cellular-based radio communications systems, a network of base stations is operated to setup a radio link with user equipment, which may be a mobile radio terminal, allowing the user equipment to move around while intermittently or continuously communicating with the network. Cellular-based systems are designed to provide connection possibility in different areas, or cells, covered by respective base stations, which are configured to support hand over operation and maintain connection with a user equipment as it moves from one cell to another. Present examples of such systems include e.g. LTE, Long-Term Evolution, as specified under the 3GPP, 3rd Generation Partnership Project. Another system is 5G New Radio (NR) that is currently being specified by the 3GPP. However, various other well-known types of radio systems exist, based on a corresponding setup as LTE and NR, and will generally be referred to herein as radio communication systems or networks.

Advances in the art of cellular-based radio communication systems involve the implementation of wideband component carriers. Today, LTE supports carrier bandwidths up to 20 MHz with mostly a fixed OFDM (Orthogonal Frequency Division Multiplexing) numerology. 5G NR, on the other hand, will introduce scalable OFDM numerology to support diverse spectrum bands/types and deployment models. For example, 5G NR must be able to operate in mm Wave bands (e.g. 28 GHz) that have wider channel widths, e.g. 100 s of MHz up to at least 400 MHz.

In 5G NR, communication and initial access was discussed in 3GPP NR work item for rel 15. It may be continuously evolved for further improvements. In particular it relates to transmission of multiple synchronization signal blocks (SSB) in a wideband component carrier. A NR carrier bandwidth of 400 MHz is relatively much wider than the LTE maximum carrier bandwidth of 20 MHz. In such a system, a base station may be configured for transmission of multiple SS blocks in a wideband component carrier.

SUMMARY

With the proposal of transmission of a plurality of SS blocks within the bandwidth of one wideband carrier from a base station, it is noted that each SS block may be transmitted in a different direction or beam. This means that a user equipment will in this context only select one of those SS blocks, and therefore have neither knowledge nor use of the other SS blocks in the same component carrier. In an environment of such wideband base stations, a multitude of SS blocks may be distinguishable for measurement (such as radio resource management (RRM) measurement).

In accordance with various aspects, methods and devices are provided for establishing access between a base station and a user equipment in a radio communication system, as provided in the appended claims.

According to a first aspect, a method is provided for establishing access for a user equipment in a wireless communication system including a base station, comprising detecting, in the user equipment, a first synchronization signal transmitted from the base station, which first synchronization signal is associated with a cell supported by the base station;

receiving a first cell signal in the user equipment from the base station, which first cell signal provides information identifying further synchronization signals transmitted by the base station at different frequencies within a wideband carrier, wherein the first and further synchronization signals are time aligned or offset within a defined range;

detecting signal strength of a plurality of synchronization signals among said first synchronization signal and said further synchronization signals.

In one embodiment, each synchronization signal is associated with a different cell supported by the base station within the wideband carrier.

In one embodiment, said information identifies synchronization signal blocks.

In one embodiment, said information identifies synchronization signal block numerology for different cell supported by the base station.

In one embodiment, said information identifies synchronization signal block location for said cells within a resource spectrum.

In one embodiment, said information identifies synchronization signal block location configuration for said cells.

In one embodiment, said first cell signal is received in the user equipment from the base station in radio resource control signaling.

In one embodiment, said time aligned synchronization signals are at least partly overlapping in time.

In one embodiment, said plurality of synchronization signals are simultaneously detected in said different frequencies.

In one embodiment, said information identifies time aligned synchronization signals at said different frequencies during a common synchronization signal burst.

In one embodiment, said plurality of synchronization signals are detected within a range of 5 ms.

In one embodiment, the method comprises the step of transmitting an indication that the user equipment supports detection of synchronization signals at different frequencies within a wideband carrier, from the user equipment to the base station.

In one embodiment, said indication announces capability of detecting synchronization signals at said different frequencies during a common synchronization signal burst.

In one embodiment, the method comprises the step of receiving a second cell signal from the base station in the user equipment, which second cell signal provides information identifying synchronization signals of different cells available within a wideband carrier of a neighbor base station.

According to a second aspect, a method is provided for establishing access to a network node for a user equipment in a wireless communication system, comprising the steps of:

transmitting a plurality of synchronization signals at different frequencies within a wideband carrier from the base station, wherein each synchronization signal is associated with each one cell supported by the base station;

transmitting a first cell signal from the base station to the user equipment, which first cell signal provides information identifying further synchronization signals transmitted by the base station at different frequencies within the wideband carrier.

In one embodiment, the method comprises detecting capability of the user device to detect synchronization signals at said different frequencies during a common synchronization signal burst;

transmitting said information, identifying further synchronization signals, in the first cell signal responsive to detecting said capability.

BRIEF DESCRIPTION OF THE DRAWINGS

Various embodiments of the invention will be described below with reference given to the drawings, in which FIG. 1 schematically illustrates a radio communication system in which a wideband base station is configured to serve multiple types of user equipment by operating plural cells within the base station.

DETAILED DESCRIPTION

The detailed description set forth below, wherein reference is made to the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the embodiments presented herein are disclosed with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software in any such form may be stored in a memory, such as a non-volatile memory, forming part of or being connected to the processing system.

Various embodiments are disclosed herein, which apply to a radio communication system in which multiple synchronization signals, or synchronization signal blocks, may be transmitted at different frequencies within the bandwidth of a wideband carrier. The description will provide examples that apply to 5G NR as a suitable example, in which the solutions suggested herein may be employed. It should be noted, though, that other radio communication systems in which multiple synchronization signals are transmitted at different frequencies within the bandwidth of a wideband carrier are plausible and in no way excluded from application of the proposed solutions.

Figure 1:
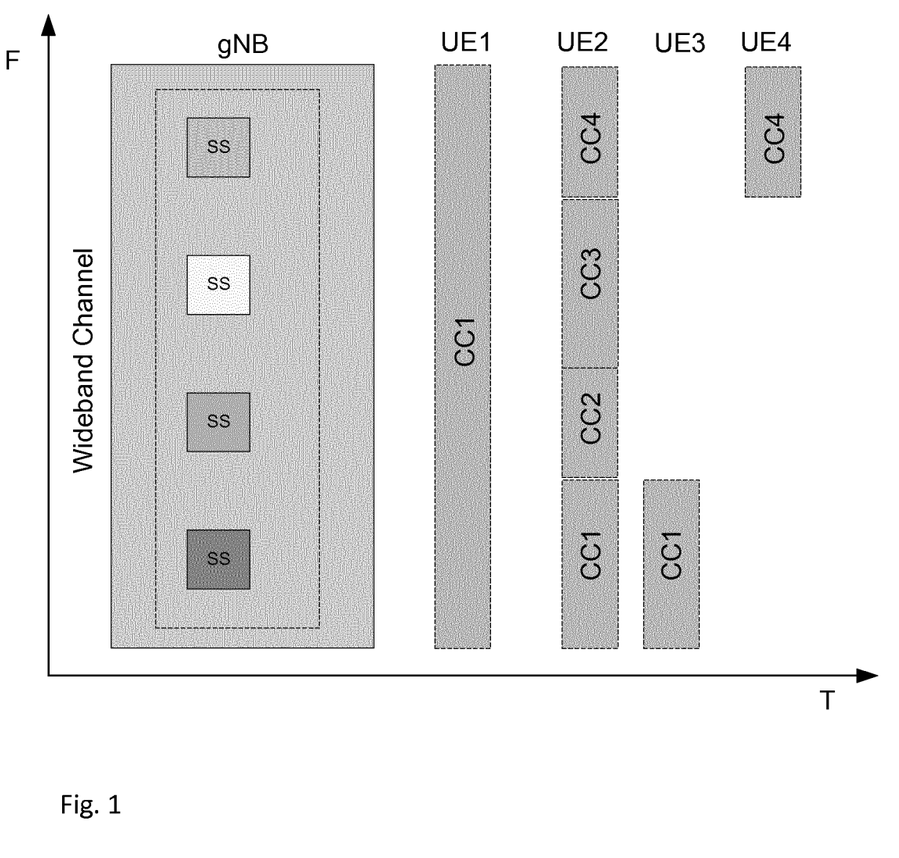
Figure 5:
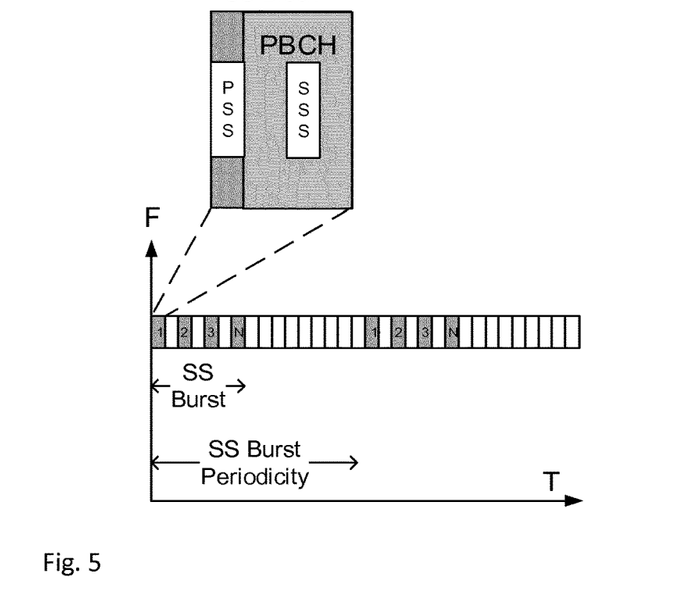
FIG. 5 schematically illustrates SS Block composition, SS Block Burst, and SS Block Periodicity.

The first release of 5G NR communication and initial access was discussed in 3GPP NR work item for rel. 15. Further improvements may be introduced, such as NR UE power savings improvements, operating in unlicensed band (NR-U), and NR Ultra Reliable Low Latency Communication (NR-URLLC). In a component carrier, it should contain at least a single SSB transmission as illustrated in FIG. 5. An SS burst may contain a consecutive SSB transmission and each SSB block can be transmitted in a certain transmit beam direction. The SS burst can be repeated with a certain periodicity. In addition, this may also involve transmission of multiple synchronization signal blocks SSB in a wideband component carrier. The transmission of multiple SS blocks in a wideband component carrier is illustrated in FIG. 1. Herein, a base station is denoted gNB, which is shown to transmit 4 SS blocks at different frequencies F within the bandwidth of a wideband carrier or channel. There are different ways in which UEs (User Equipment) can utilize such a wideband carrier. In a first case, a UE (UE1) can fully support wideband reception by using a single component carrier (CC) wideband receiver. In a second case a UE (UE2) can employ multiple receivers that segment the wideband carrier into sub-bands, with each sub-band processed by a separate receiver. In a third case, a UE (UE3 or UE4) can only use part(s) of the wideband carrier. In the third case, the UE is called a narrowband UE.

A SS block may comprise at least one synchronization signal, detectable by UEs to initiate access with the base station. In NR, a SS Block may contain at least synchronization signals PSS (Primary Synchronization Signal) and SSS (Secondary Synchronization Signal), and a Physical Broadcast Channel (PBCH). The SS block is further associated with a physical cell identity (PCI).

A wideband component carrier which may contain multiple SS blocks in the frequency domain transmitted from one gNB may provide various benefits:

Each SS block may be transmitted in a different direction (beam) than the other SS blocks. This may be used by wideband UEs to detect which beam they are in much faster, compared to a case when SS blocks for different beams are transmitted consecutively. Hence, each SS block has an associated uplink resource, e.g. to be used for preamble transmission (RACH Message 1), in which the base station beam of the associated cell is listening, in the same direction as the one used during the SS block transmission. This may also be used by wideband UEs to perform averaging in order to measure the power of received signal.

The gNB can exploit the multiple SS blocks to distribute narrowband UEs, may only receive one SS block, in the frequency domain. This operation is also known as load sharing where the narrowband UEs are not necessarily attached to a single cell but distributed to several cells within a wideband component carrier.

Agreements have already been made in the 3GPP RAN1 September 2017 meeting (R1-1716942):

From UE perspective, a cell is associated with a single SS block. In this context, the cell-defining SS block has an associated RMSI (Remaining Minimum System Information). From the RAN1 perspective, the cell defining SS block could for example be used for Common PRB (Physical Resource Block) indexing, scrambling etc.

Multiple SS blocks can be transmitted within the bandwidth of a wideband carrier These agreements can be interpreted to mean that if a gNB transmits multiple SS blocks, each associated with a separate PCI, then multiple cells are available in a single wideband carrier. In addition to synchronization purposes, the SS block is also used for measurements, e.g. SS block-based RSRP (Reference Signal Received Power). A wideband UE, e.g. UE1 as in FIG. 1, can derive benefit from performing simultaneous SS block-based measurements by aggregating SS block measurements over the multiple received SS blocks (in frequency domain). However, in this interpretation of the agreements, the SS blocks each have different cell IDs and the SS block configuration is unknown to the UE. A solution to this problem is proposed herein, providing a method by means of which a wideband UE can utilize multiple SS blocks in a wideband carrier for measurement purposes.

In NR, RRM (Radio Resource Management) measurements can be based on the received SS block(s) and/or the received reference signals such as CSI-RS (Channel State Information-Reference Signal). These measurements may have different properties. SS block-based measurements typically have wider beam-width operation and CSI-RS typically has narrower beam-width operation. SS block can be used for the measurement purpose by all UEs in a cell and CSI-RS can only be used for the measurement only by the designated UE that receives the CSI-RS. In order to be able to perform measurements based on multiple SS blocks, it is proposed herein that a UE can indicate to the base station, e.g. gNB, that it supports wideband operation using UE capability messaging. More specifically, the UE may announce capability of detecting synchronization signals at said different frequencies during a common synchronization signal burst. This may be carried out once a wideband UE can find a cell and camp on it, such as at first attach to a wireless network. Moreover, the UE can also indicate whether to use the full or partial wideband measurement. This may provide increased knowledge of the behavior of the UE in the cell, and the base station may thus take that into consideration for overall traffic management of the UEs in the cell.

From a base station perspective, a method may thus be provided for establishing access to a network node for a user equipment in a wireless communication system, comprising:

transmitting a plurality of synchronization signals at different frequencies within a wideband frequency from the base station, wherein each synchronization signal is associated with one cell supported by the base station;

transmitting a first cell signal from the base station to the user equipment, which first cell signal provides information identifying further synchronization signals transmitted by the base station at different frequencies within the wideband frequency.

This method may involve receiving, in the base station, an indication that a user equipment supports wideband operation;

In this context, a base station such as a gNB may inform the UE, which detects a synchronization signal such as one of the SS blocks, which other synchronization signals, or SS blocks associated with various different cells, that are available within the wideband component carrier of the base station. This may e.g. beneficially be used in the UE when monitoring candidates for switching cells, e.g. due to poor connection in the cell the UE is camping on, for instance due to UE mobility or signal interference. In various embodiments, the information identifying cells available within the wideband carrier may include beam direction data for the respective cells or SS blocks. This may furthermore be used together with location or direction data for the UE, to optimize cell selection when moving within the coverage of the base station, to appropriately estimate a next suitable cell. This may save additional signal measurements, and thus positively affect UE power consumption.

In one embodiment, the information identifying the cells may identify cell-specific data, such as Physical Cell Identity (PCI) for one or more of the cells, such as all cells, or all cells other than the one for which the associated SS block was detected by the UE, available within the wideband carrier.

In one embodiment, the provided information identifying the cells may in addition or in the alternative to identifying cell-specific data, identify the SS blocks associated with the cells available within the wideband carrier. This information may identify the SS blocks for one or more of the cells, such as all cells, or all cells other than the one for which the associated SS block was detected by the UE, available within the wideband carrier.

In one embodiment, the information may identify SS block numerology for said cells, such as sub-carrier spacing. This is beneficial in a system where a scalable OFDM numerology is employed. By including an identification of SS block numerology for other SS blocks, in the information of the first synchronization signal, such as a first SS block, the user equipment is made aware of what numerology each SS block uses, and thereby made capable of detecting and reading these extra SS blocks over the bandwidth during measurements. This may provide a convenient alternative to e.g. separate BWP related signaling.

In one embodiment, the information may identify SS block location for said cells within a resource spectrum, such as time and frequency resources dedicated to the respective SS blocks.

In one embodiment, the information may identify SS block location configuration for said cells. This information may e.g. include one or more of SS block beam transmission pattern, SS block bursts duration, SS block bursts interval, and SS block measurement timing configuration. By including information identifying any of these features of SS block location configuration, a user equipment detecting a first synchronization signal will gain immediate knowledge of the SS block configuration for plural synchronization signals transmitted at different frequencies within the wideband carrier.

A UE which performs wideband measurement has shorter measurement timing. It can be in a proportionally shorter than a single frequency SS block measurement depending on the number of multiple SS blocks in frequency domain.

In one embodiment, the information may identify the relation of multiple SS blocks in frequency domain. For example, some (or all) of the SS blocks may be quasi co-located. Thus, for example, it has similar physical layer properties, such as receive angle of arrival, transmit angle of departure, spatial correlation of receiver antennas, Doppler shift, and/or, average delay spread.

Figure 6A:
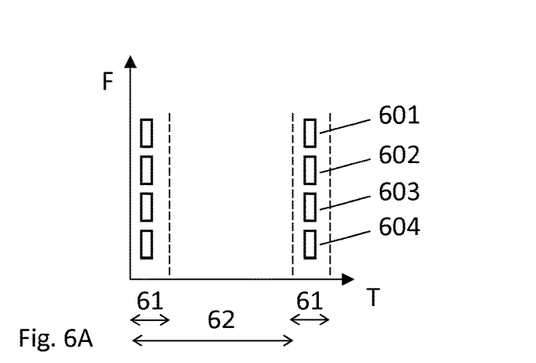
FIGS. 6A-6C schematically illustrate SS Block composition, SS Block Burst, and SS Block Periodicity where SS block transmission is time aligned or have a defined offset.
Figure 6B:
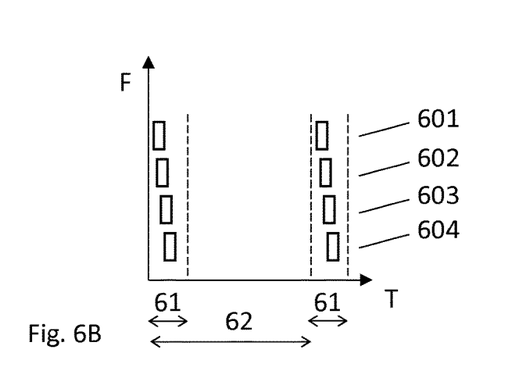
Figure 6C:
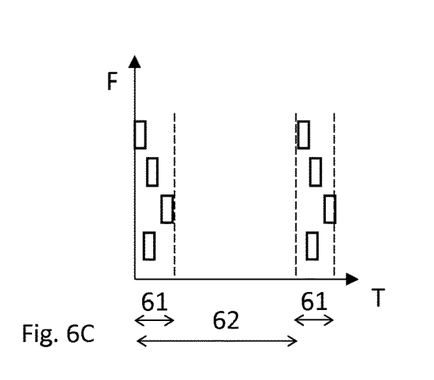

FIG. 5 schematically illustrates state of the art SS Block composition, SS Block Burst, and SS Block Periodicity. However, in FIGS. 6A-6C, more detailed embodiments in accordance with FIG. 1 are disclosed, where SS block transmission is time aligned. Preferably, all of the SS blocks are time aligned. In case they are not perfectly aligned then a time offset, which may also be included in said information, is preferably within a defined range. In the exemplary embodiments of FIGS. 6A to 6C, four SSBs 601-604 are shown, e.g. corresponding to blocks 1-4 of FIG. 5. However, the synchronization signals, e.g. SS blocks, are time aligned to different extent. In FIG. 6A, the SSBs 601-604 are transmitted simultaneously, at different frequencies of a wideband carrier, within a burst 61. Other SS Blocks may be transmitted at other occasions. However, after a certain defined period, such as an SS burst period 62, transmission is repeated in the same manner from the base station. In FIG. 6B, the SSBs are aligned to be at least partly overlapping in time, but may be transmitted with a time offset of a pre-defined range. FIG. 6C illustrates another embodiment, where the transmission times of SSBs at different frequencies 601-604 need not overlap, but are within a defined range of time. The range may e.g. be an SSB burst 61, which is repeated with an SSB burst periodicity 62. Preferably, the offset does not exceed a range of 5 ms, or e.g. 10 ms, or is limited such that the overlapping SSBs are transmitted at different frequencies within a range of 5 ms or 10 ms, e.g. in a common SSB burst.

This provides the opportunity for a user equipment to detect synchronization signals at least partly concurrently in said different frequencies. After the user equipment has received first cell signal from the base station, information from that first synchronization signal may be detected which identifies further synchronization signals transmitted by the base station at different frequencies within a wideband carrier, wherein said further synchronization signals are time aligned or offset within a defined range. The user equipment may thereby detect signal strength of a plurality of synchronization signals among said first synchronization signal and said further synchronization signals, which are transmitted at different frequencies. This provides a benefit for a user equipment capable of wideband reception, in that signal strength measurement, e.g. for the purpose of producing a candidate list to the base station, is made more efficient. For example, signal strength measurement may be carried out on a plurality of different SSBs 601-604 within one period 62, such as a single SSB burst. Preferably, all of the SS blocks are time aligned. In case they are not aligned then the time offset which may also be included in said information is preferably within a defined range.

In a preferred embodiment, the aforementioned information is informed to the UE via UE-specific RRC (Radio Resource Control) signaling, since this information may only be used by a UE supporting wideband operation. Providing this information in UE-specific signaling rather than by broadcast, which may be used for transmitting the synchronization signals, thus conserves resources in broadcast data.

In one embodiment, the method may involve the step of transmitting an indication signal from the base station, which indicates whether the base station supports operation of wideband measurements. Such an indication signal may form part of an SS block, or alternatively as RRC signaling directed to the UE. This may be appropriate when the various SS blocks are configured independently, so that it may not be possible or optimal for the UE to perform wideband measurement. In one embodiment, the method may include the step of determining, in the base station, whether synchronization signal blocks associated with said cells are configured independently; and transmitting an indication signal from the base station, which indicates whether the base station supports operation of wideband measurements based on said determination.

In one embodiment, this may entail transmitting an indication signal only if the base station supports operation of wideband measurements. Alternatively, an indication signal is transmitted and includes an indication which is decoded or interpreted in the UE to determine if the base station supports operation of wideband measurements.

Figure 2:
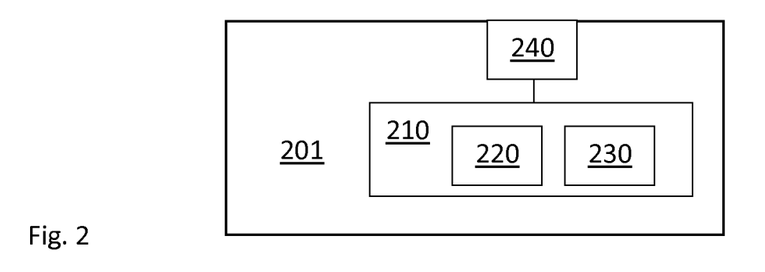
FIG. 2 schematically illustrates a base station configured to operate plural cells in a wide band component carrier.

FIG. 2 schematically illustrates a base station 201 configured for wideband operation, e.g. in a 5G NR mobile communications system. In such a system, the base station is preferably connected to a network backbone (not shown), for communicative connection with other base stations and other networks. The base station 201 comprises a control unit 210, which includes at least one processing device 220 and a memory 230, such as a non-volatile memory, for holding program code for execution by the processing device. The base station further comprises a radio transceiver unit 240, which is configured to operate under control of the control unit 210. The radio transceiver unit base is preferably connectable to an antenna (not shown), for providing a device for a radio interface to user equipment operating in the radio communication system.

According to one aspect, as exemplified by means of FIG. 2, a base station is provided for establishing access for a user equipment in a wireless communication system, comprising a radio transceiver unit, and a control unit including a processing device and a memory including program code, wherein the processing device is configured to execute the program code to cause the base station to transmit a plurality of synchronization signals at different frequencies within a wideband carrier, also referred to as a wideband component carrier, from the base station, wherein each synchronization signal is associated with each one cell supported by the base station;

transmit a first cell signal from the base station to the user equipment, which first cell signal provides information identifying further synchronization signals transmitted by the base station at different frequencies within the wideband carrier. In various embodiments, the processing device may be configured to execute program code to cause the base station to carry out any of the method steps outlined herein.

Figure 3:
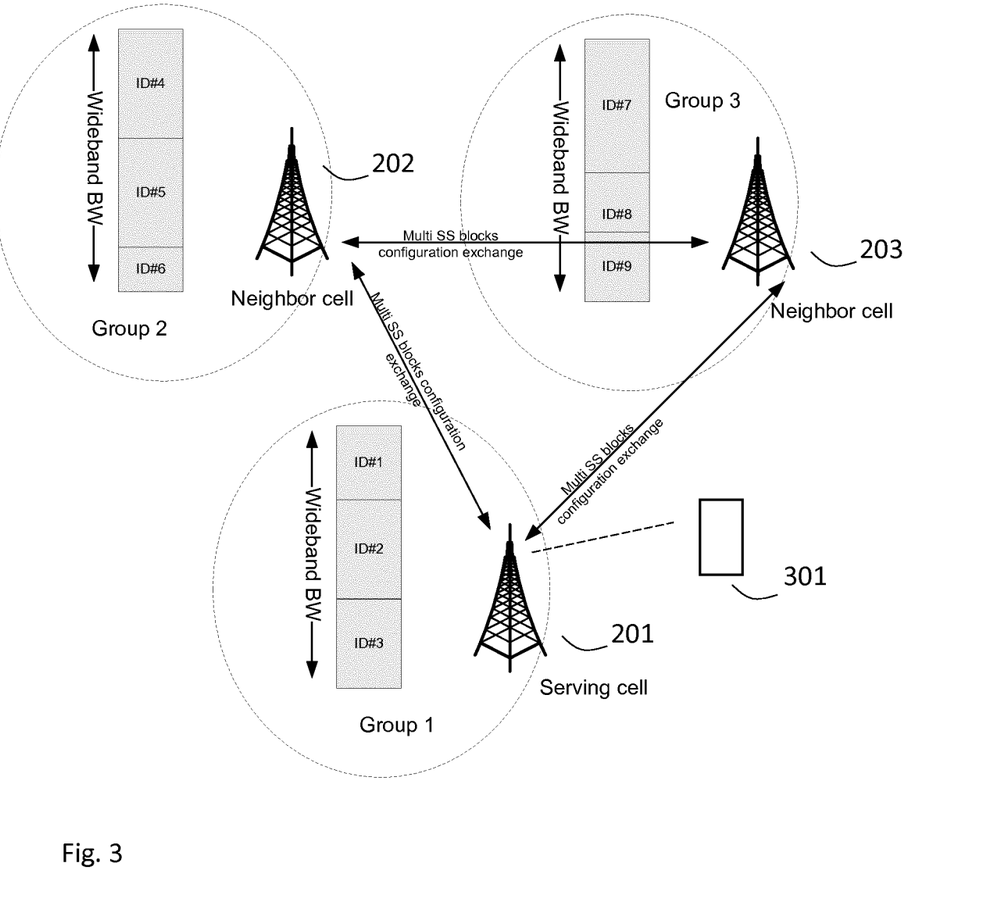
FIG. 3 schematically illustrates multiple SS blocks transmission from multiple base stations.

FIG. 3 illustrates such a scenario for various embodiments, where the method as described may be extended so that the UE can perform neighbor cells measurement based on wideband carrier, in case the neighbor cells perform wideband transmission. In FIG. 3, multiple SS block transmissions originate from plural base stations 201, 202, 203. In such an embodiment, one or more neighbor cells 202, 203 may inform a serving cell 201 of such a capability, which may subsequently be used to provide information to a UE 301 capable of wideband operation. In such an embodiment, the method may thus comprise the step of receiving, in the base station 201, an indication that a neighbor base station 202, 203 supports wideband measurement, and information identifying the cells available within the wideband carrier of that neighbor base station. This indication related to neighbor base stations is preferably provided over a network backbone (not shown) of the mobile communication system.

With reference to the description above, each neighbor base station 202, 203 may inform the serving base station which cells, and/or SS blocks associated with such cells, that are available within the wideband component carrier of said neighbor base station.

In one embodiment, the information identifying the cells may identify cell-specific data, such as Physical Cell Identity (PCI) for one or more of the cells, such as all cells operated by the neighbor base station 202, 203.

In one embodiment, the provided information identifying the cells may in addition or in the alternative to identifying cell-specific data, identify the SS blocks associated with the cells available within the wideband carrier. This information may identify the SS blocks for one or more of the cells, such as all cells, operated by the neighbor base station 202, 203.

In one embodiment, the method may include transmitting a second cell signal from the base station to the user equipment, which second cell signal provides information identifying one or more cells available within a wideband carrier of a neighbor base station. Preferably, this second cell signal is provided in RRC signaling. In one embodiment, the second cell signal may form part of or be sent in correlation with the first cell signal. In one embodiment, the second cell signal may be provided from the serving base station responsive to determining that a cell reselection or handover is intended or appropriate, e.g. based on detected signal strength from the UE in the serving base station, or detected signal strength in the UE from the serving base station and reported to the serving base station.

In a preferred embodiment, the information identifying one or more cells available within a wideband carrier of a neighbor base station 202, 203 comprises the SS block configurations for those base stations.

As indicated in FIG. 3, one embodiment may include providing a group identification 1, 2 or 3 of cells. Such a group thus defines a set of multiple PCI within the same wideband component carrier transmitted from one base station. In such an embodiment, information identifying the cells available within the wideband carrier of that neighbor base station may include a group identification. In one embodiment, also the second cell signal from the base station to the user equipment may provide information identifying group identification for one or more cells available within a wideband carrier of a neighbor base station.

The description as provided above is primarily directed to the base station of a mobile communication system, but may correspondingly be provided for application in a user equipment. Such a method may be provided for establishing access for a user equipment in a wireless communication system including a base station, comprising detecting, in the user equipment, a synchronization signal transmitted from the base station, which synchronization signal is associated with a cell supported by the base station;

receiving a first cell signal in the user equipment from the base station, which first cell signal provides information identifying further synchronization signals transmitted by the base station at different frequencies within a wideband frequency of the wideband carrier. As such, the first cell signal provides information identifying one or more cells available within a wideband carrier emitted by said base station.

Figure 4:
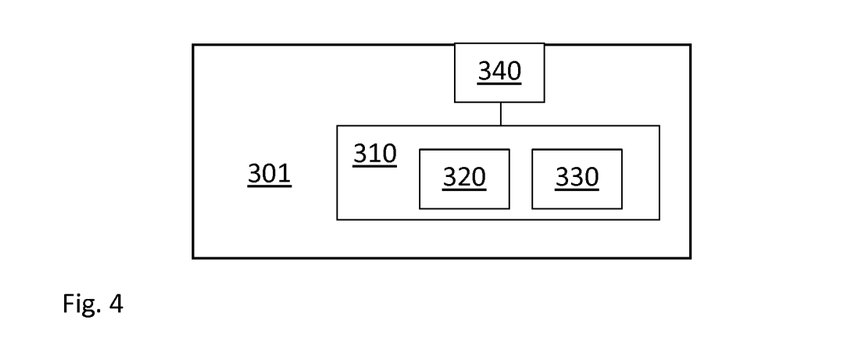
FIG. 4 schematically illustrates a wideband user equipment configured to operate with a base station offering plural cells in a wide band component carrier.

FIG. 4 schematically illustrates a user equipment 301 configured for wideband operation, e.g. in a 5G NR mobile communications system. The user equipment may e.g. be a mobile communication chipset, a mobile phone, a wearable device, or even a stationary device. The user equipment may include a user interface, a casing or support structure, and a power supply, which are standard elements that are not shown in the drawing. The use equipment 301 comprises a control unit 310, which includes at least one processing device 320 and a memory 330, such as a non-volatile memory, for holding program code for execution by the processing device. The user equipment may further comprise a radio transceiver unit 340, which is configured to operate under control of the control unit 310. The radio transceiver unit base is preferably connectable to an antenna (not shown), for providing a device for a radio interface to a base station operating in the radio communication system.

According to one aspect, as exemplified by means of FIG. 4, a user equipment is provided for establishing access in a wireless communication system including a base station, comprising a radio transceiver unit, and a control unit including a processing device and a memory including program code, wherein the processing device is configured to execute the program code to cause the user equipment to detecting, in the user equipment, a synchronization signal transmitted from the base station, which synchronization signal is associated with a cell supported by the base station;

receive a first cell signal in the user equipment from the base station, which first cell signal provides information identifying further synchronization signals transmitted by the base station at different frequencies within a wideband frequency.

A UE configured to operate such a method will thus be provided with information usable for sensing and making measurements on synchronization signals, such as SS blocks, for different cells supported within the bandwidth of a wideband component carrier base station. In one embodiment, this method may thus comprise the step of detecting, in the user equipment, synchronization signal blocks associated with said cells at different frequencies within the wideband carrier.

It should be noted that the subject matter described for the different embodiments related to the base station, such as 201 of FIG. 2 or 3, above are applicable in a corresponding manner to a user equipment 301, such as 301 of FIG. 4, configured for wideband operation in e.g. a 5G NR system. In various embodiments, the processing device 310 may be configured to execute program code to cause the user equipment 301 to carry out any of the method steps outlined herein.

Various embodiments have been outlined above, and it should be understood that these embodiments may be combined in any form that is not contradictory. The scope of the invention is only limited by the appended claims.

The invention claimed is:

1. A method for establishing access for a user equipment in an associated wireless communication system including a base station, the method comprising:

detecting, in the user equipment, a first synchronization signal transmitted by the base station in a first synchronization signal block (SSB), wherein the first synchronization signal is associated with a cell supported by the base station;

receiving a first cell signal in the user equipment from the base station, wherein the first cell signal provides information identifying one or more further synchronization signals transmitted by the base station in respective further different SSBs within a wideband component carrier, wherein the SSBs of the first and one or more further synchronization signals are received within a shared synchronization signal block burst (SSB Burst) having a synchronization signal block burst duration, wherein the first and sfurther different SSBs are:
  i) received by the user equipment from the base station at different frequencies within the wideband component carrier; and
  ii) received by the user equipment in a mutually non-overlapping time offset relationship within the synchronization signal block burst duration of the shared SSB Burst; and
detecting by the user equipment signal strength of a plurality of synchronization signals among the first and one or more of said further synchronization signals during the shared SSB Burst.

2. The method of claim 1, wherein each synchronization signal is associated with a different cell supported by the base station within the wideband component carrier.

3. The method of claim 1, wherein said information identifies synchronization signal blocks.

4. The method of claim 3, wherein said information identifies synchronization signal block numerology for a different cell supported by the base station.

5. The method of claim 3, wherein said information identifies synchronization signal block location for said cell supported by the base station within a resource spectrum.

6. The method of claim 3, wherein said information identifies synchronization signal block location configuration for said cell supported by the base station.

7. The method of claim 1, wherein said first cell signal is received in the user equipment from the base station in radio resource control signaling.

8. The method of claim 1, wherein said plurality of synchronization signals are simultaneously detected in said different frequencies.

9. The method of claim 1, wherein said information identifies time aligned synchronization signals at said different frequencies during a common synchronization signal burst.

10. The method of claim 9, wherein said time aligned synchronization signals are at least partly overlapping in time.

11. The method of claim 1, wherein said plurality of synchronization signals are detected within a range of 5 ms.

12. The method of claim 1, further comprising:
transmitting an indication that the user equipment supports detection of synchronization signals at different frequencies within the wideband component carrier, from the user equipment to the base station.

13. The method of claim 12, wherein said indication announces capability of detecting synchronization signals at said different frequencies during a common synchronization signal burst.

14. The method of claim 1, further comprising:
receiving a second cell signal from the base station in the user equipment, which second cell signal provides information identifying synchronization signals of different cells available within a different wideband component carrier of a neighbor base station.

15. The method of claim 1, further comprising:
transmitting an indication that the user equipment will detect synchronization signals at different frequencies within the wideband component carrier, from the user equipment to the base station.

16. A method for establishing access to a network node for a user equipment in a wireless communication system, comprising:
transmitting a plurality of synchronization signals at different frequencies within a wideband component carrier from the base station, wherein each synchronization signal is associated with a cell supported by the base station; and
transmitting a first cell signal from the base station to the user equipment, wherein the first cell signal provides information identifying further synchronization signals transmitted by the base station in different synchronization signal blocks within the wideband component carrier,
wherein the further synchronization signals comprise a first synchronization signal block (SSB) transmitted by the base station within a first synchronization signal block burst (SSB Burst) having a synchronization signal block burst duration and a SSB transmitted by the base station within the SSB Burst, wherein the first and second SSBs are:
  i) transmitted by the base station at different frequencies within the wideband component carrier; and
  ii) mutually non-overlapping time offset within the synchronization signal block burst duration of the SSB Burst.

17. The method of claim 16, further comprising
detecting a capability of the user equipment to detect synchronization signals at said different frequencies during a common synchronization signal burst; and
transmitting said information, identifying further synchronization signals, in the first cell signal responsive to detecting said capability.

18. The method of claim 16, further comprising:
receiving an indication from the user equipment that the user equipment supports detection of synchronization signals at the different frequencies within the wideband component carrier,
wherein the transmitting the first cell signal comprises:
  transmitting the first cell signal based on receiving the indication from the user equipment that the user equipment supports detection of synchronization signals at the different frequencies within the wideband component carrier.

19. The method according to claim 16:
wherein the transmitting the first cell signal comprises:
  transmitting a first cell signal that provides information identifying a start time offset between the first and second SSBs; and
further comprising transmitting the first and second SSBs at different start times mutually offset by the start time offset.

20. A method for establishing access for a user equipment in an associated wireless communication system including a base station, the method comprising:
detecting, in the user equipment, a first synchronization signal transmitted by the base station, wherein the first synchronization signal is associated with a cell supported by the base station;
transmitting by the user equipment an indication that the user equipment supports detection of synchronization signals at different frequencies within a wideband component carrier;

receiving, based on the transmitting the indication, a first cell signal in the user equipment from the base station, wherein the first cell signal provides information identifying: i) further synchronization signals transmitted by the base station in different synchronization signal blocks within the wideband component carrier, and ii) a start time offset between the identified further synchronization signals, wherein the further synchronization signals comprise a first synchronization signal block (SSB) transmitted by the base station within a synchronization signal block burst (SSB Burst) having a synchronization signal block burst duration and a second SSB transmitted by the base station within the SSB Burst, wherein the first and second SSBs:
  i) are received in the user equipment within the synchronization signal block burst duration of the SSB Burst at different frequencies within the wideband component carrier; and
  ii) are received in the user equipment within the synchronization signal block burst duration of the SSB Burst during different mutually non-overlapping times offset in accordance with the start time offset; and
detecting by the user equipment signal strength of a plurality of synchronization signals among the further synchronization signals.

* * * * *